Figure 1:
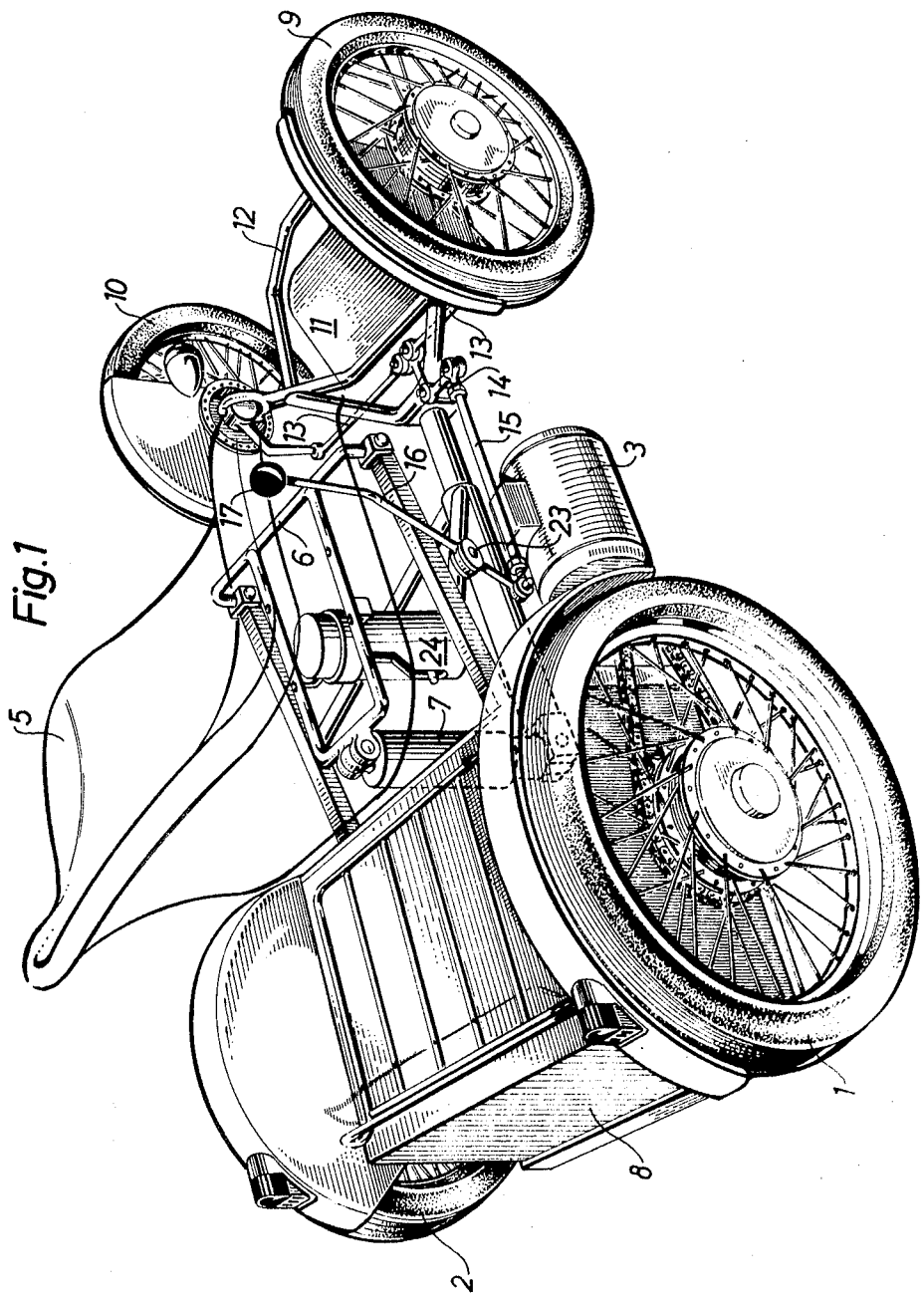

United States Patent

Udden et al.

[15] 3,664,450
[45] May 23, 1972

[54] ELECTRICALLY POWERED FOUR-WHEELED SINGLE VEHICLE

[72] Inventors: Per Edward Carl Udden; Bert Hjalmar Engman; Siegfried Graf, all of Box 90, 861 00 Timra, Sweden

[22] Filed: June 1, 1970

[21] Appl. No.: 42,116

[30] Foreign Application Priority Data

June 2, 1969 Sweden..................................7712/69

[52] U.S. Cl..............................180/65 R, 280/34 R, 280/111
[51] Int. Cl. .......................................B60k 1/00, B60l 11/18
[58] Field of Search......................180/65, 70, 55, 56, 57, 58, 180/59, 60, 61, 62, 63, 54 F; 280/111, 112, 34

[56] References Cited

UNITED STATES PATENTS

| | | | |
|---|---|---|---|
| 583,018 | 5/1897 | Baker | 180/70 |
| 3,179,199 | 4/1965 | Moran | 180/65 |
| 1,202,472 | 10/1916 | Binford | 280/111 X |
| 698,376 | 4/1902 | Crowdus | 180/60 |
| 873,711 | 2/1941 | Bruen | 180/1 X |
| 2,233,318 | | Lewis et al. | 280/111 X |

Primary Examiner—Benjamin Hersch
Assistant Examiner—Milton L. Smith
Attorney—Fred C. Philpitt

[57] ABSTRACT

Electrically powered four-wheeled single vehicles especially for disabled persons and invalids and specifically made for out-door use must have such stabilizing qualities that under all circumstances there is no risk for the chair to turn over even if it will have to force different kind of obstacles such as curbs. A further object of such vehicles is to provide a simple and safe steering operation so that the forces from the obstacles to be forced must not be transmitted to the steering handle, since patients in many cases have considerably reduced power to control such forces by hand. These objects are realized in the present invention substantially by the fact that the vehicle comprises a rear and a front portion which are swingably connected to each other by means of telescopic pipes or the like running substantially in parallel with the ground and in the longitudinal direction of the vehicle. To meet the requirement of a safe and unaffected steering operation the front wheels are neutrally positioned in a way that the extension of the swivel axles will cut the contact surfaces between the corresponding wheels and the ground.

4 Claims, 2 Drawing Figures

ELECTRICALLY POWERED FOUR-WHEELED SINGLE VEHICLE

Four-wheeled single vehicles for outdoor use are with the present conventional designs too wide to cover all transportation demands for instance for invalids. It is therefore desirable that the width of the vehicle not substantially exceeds a size of 70 cm. Simultaneously from a stabilizing point of view the angle between the resulting center of gravity and the contact surfaces between the wheels and the associated supporting surface has to be small even if the driver is sitting in normal chair-height. The vehicle must also be thus designed that it could pass over obstacles such as curbs with a height about 15 cm. Moreover, it is obvious that the vehicle must not stall or rear itself and this means that under all conditions even when driven upwards in steep slopes and great torque is applied to the driving wheels a sufficient part of gravity must be distributed on all wheels. Moreover it is desirable that the wheel shaft distance could be easily varied so that the minimum length not substantially exceeds about 120 cm and sufficient length of the vehicle could be derived even for long-legged persons or when extremely good driving qualities are required for instance when driving on roadways.

There are principally three different types of electrically powered single vehicles such as invalid wheel-chairs for outdoor use. One type is the so called "Permobil", which substantially is characterized by a pair of non-steerable front wheels and a pair of rear driving wheels, which are swingable around a substantially vertical axis by means of an electrical motor. Further, there are three-wheeled chairs in which the steering wheel is situated underneath, in front of or between the feet of the driver or alternatively form the rear wheel of the vehicle. If the latter is the case, the vehicle must be extremely long to permit satisfactory stability. However, if the steering wheel is situated in front of the driver, the vehicle will not be able to pass over obstacles such as curbs without great risk for turning over. A still further type of vehicle is provided with two big front wheels and two rear pivot wheels which are mounted to permit a swinging movement around the vertical pivot axis. However, if a wheel chair with pivot wheels is driven backwards, the resulting wheel shaft distance is substantially decreased and when the chair is swung laterally the contact surface for one of the pivot wheels is moving towards the lead line of the center of gravity. These effects will result in considerable drawbacks and for the first the decreased wheel shaft distance is very dangerous when the chair is backed down a curb as many patients for medical reasons have to do and secondly to compensate for the instability when one of the pivot wheels is swung towards the lead line of the center of gravity the chair must have certain width which cannot go below a measure of 80 cm. Even the steering operation with these prior art wheel chairs has certain disadvantages and specifically when driving sideways up a curb or other obstacle the pivot wheels will transmit very strong forces in the steering device and specifically in hand steering such forces can be very difficult to control for the patient.

The object with the present invention is to eliminate the drawbacks mentioned above, which all prior art vehicles are impaired by and simultaneously realize a simple and consequently a cheap design, which could be used by partially disabled persons, who may not need an expensive and complicated wheel-chair such as the "Permobil".

These objects are realized in a vehicle according to the invention which is substantially characterized by the fact that the rear and the front portions are connected to each other by means of two shaft parts, which are swingable around a common central axis and rigidly connected to each part of the frame, said shaft parts being disposed with their central axes substantially in parallel with the ground and in the longitudinal direction of the vehicle, and that the swivel axles of the front wheels are disposed substantially above the contact surfaces between the corresponding wheels and the ground in such a way that the extensions of said swivel axles will cut the corresponding contact surfaces.

An embodiment of the vehicle according to the invention will now be described in detail reference being made to the accompanying drawings in which FIG. 1 is a perspective view of the vehicle where the characterizing parts are shown in detail while conventional parts ahead have been indicated in dotted lines.

Figure 2:
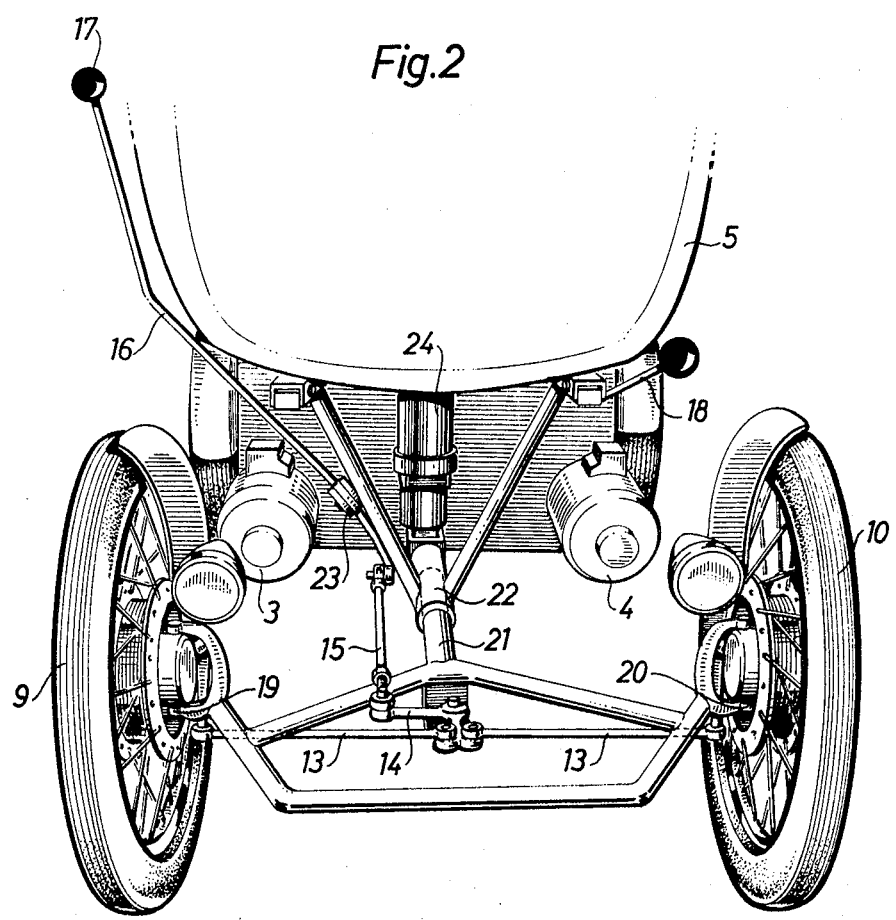

FIG. 2 is a front view of the vehicle according to FIG. 1 in which the foot-plate has been removed.

The vehicle according to the invention is provided with two rear driving wheels 1 and 2 with separate traction motors 3 and 4. In one embodiment of the invention there is only one traction motor, which via a differential gear is driving the two rear wheels. When the wheels are driven separately it is essential, however, that the transmission from the motor to the wheels is not of the self-braking type despite that the gearing ratio must lie between 15:1 and 80:1. Even a relatively low self-braking effect will namely give raise to difficulties in the steering of the vehicle. A worm gear with a gear ratio between 8:1 and 20:1, preferably 11:1 and a chain transmission with a gear ratio between 3:1 and 5:1 will not appreciably affect the driving characteristics if the angles of the worm gear are chosen in a suitable way.

To increase the stability the rear driving wheels have been rigidly connected with the frame of the chair. The seat 5 is swingable around a transverse axis 6 just behind the back part of the knee of the driver and the seat is resiliently supported by means of a combined spring- and shock absorber 7 which decreases the catapult effect in rapid braking operations. The seat 5 is placed in front of the rear wheel shaft so that the risk for stalling has been considerably decreased. To give the vehicle a low center of gravity the accumulators 8 have been placed between the rear wheels.

The two front wheels 9 and 10 have a diameter which can vary between 30 and 50 cm and between the wheels there is a foot-plate 11 which is entirely inside the side projection of the front wheels to make it possible to drive up a curb which is higher than the front edge of the foot-plate. At frontal collisions damage is decreased or eliminated on one hand by a shock-absorber 12 and on the other hand by arranging the front edge of the steering wheels in front of the foot-plate 11. The steering wheels are conventionally actuated by means of tie rods 13 which are approximately equally long and connected to a knee-lever 14 which in turn is actuated by a link rod 15 disposed substantially in parallel with the longitudinal axis of the chair and close to the center line of the same. The link rod 15 is displaced to and fro by means of a steering bar 16 with a handle 17, which is manually controlled. This handle could be provided with speed and braking control means as are normally used in motorcycles and the like. The driving wheels are braked by means of brake drums in the wheels and the brakes are actuated by means of links or wires from a transverse axle, which in turn is actuated by means of a hand control 18. This axle could be connected with a device for speed control, for instance a switch or a potentiometer which is connected to an electronic speed control. The control is suitably thus arranged that the speed will decrease to zero before the brakes are actuated. To eliminate damages on the switches or the electronic equipment a control device for forwards and backwards movement makes it impossible to change the direction of movement before changing the position of a control knob. The parking brake could be thus arranged that the brake control is locked in the braking position.

The two front wheels 9 and 10 have been neutrally positioned, which means that the extension of their swivel axles 19 and 20, respectively, will hit the contact surfaces between the corresponding wheels and the ground. To increase the stability some embodiments have been supplied with front wheels with certain camber-, castor-and to-in-angles as commonly known. It has been proved that a chair, in which the front wheel unit is swingable around a longitudinal axis in relation to the frame of the chair can be driven sideways up a curb without essential affection of the driving direction even if the steering handle has been let off. The front wheel unit is connected with the frame and the rear wheel unit via two shaft parts 21 and 22, respectively, in the center plane of the chair and these parts are displacable in each other and could be fixed in arbitrary positions. The axles are swingable in relation to each other which permits the front wheels closely to follow all irregularities on the ground. It has appeared to be suitable and further increased the stability of the vehicle if the swinging movement between the front wheel portion and the rear wheel portion is resiliently damped for instance by means of a torsion spring in the connecting axle.

The longitudinal link rod 15 can in a similar way be adapted to or manufactured in different lengths. When the chair is steered by means of the steering bar 16 there is a demand for wide steering deflections with only small movements of the handle 17. This is due to the fact that in some cases the range of movement of the patient is very limited and even for other reasons it has appeared to be suitable with a small control range of the steering bar. This object is realized through the neutral positioning of the front wheels, so that only small forces are required for the steering operation. The setting of the control range could be accomplished by connecting the lever 15 at different distances from the fulcrum 23 of the steering bar 16.

The horizontal connection between the front and the rear portions of the frame is disposed at low height above ground for instance at 10 cm with the link rod 15 in parallel with and close to the shaft parts 21 and 22. The seat of the vehicle will be easy to take and leave when the front wheels have been swung aside. With a diameter of about 50 cm of the rear wheels and about 40 cm of the front wheels and a total length of about 130 cm of the vehicle the taking and leaving of the seat will become very easy and this has been further facilitated by means of a device 24 which makes it possible to turn the seat 5 about 90° from the longitudinal axis of the vehicle.

The steering wheels should be able to turn an angle of about 45° to each side in order to achieve a short turning radius and this could be accomplished without increasing the width of the chair over the stipulated measure of 70 cm if the foot-plate 11 is placed in front of the divided tie rod 13 and is given a moderate forward extension for instance of a substantially elliptic design.

In a further embodiment of the invention the hand steering bar could be replaced by a rod for steering the chair with one knee via a horizontal link system.

In a further embodiment of the chair the steering operation could be controlled by an electronic steering equipment which is operated by a person walking next to the chair.

We claim:
1. An electrically powered four-wheeled vehicle that is especially useful for invalids, comprising in combination:
   a. a rear section and a front section,
   b. said rear section including a pair of driving wheels, means for driving said wheels and a driver's seat,
   c. said front section comprising a pair of front wheels and a framework interconnecting said wheels,
   d. braking means for at least some of said wheels and steering means for said front wheels,
   e. said rear and front sections being interconnected to each other by means of a pair of telescoping tubular shafts, one shaft being connected to said rear section and one shaft being connected to said front section,
   f. the said tubular telescoping shafts of e being positioned in axial alignment with each other along the longitudinal axis of the vehicle and having at least limited rotative movement relative to each other,
   g. said tubular shafts being disposed above the ground at a height which is less than the radius of the smallest wheels on the vehicle.

2. A vehicle according to claim 1 wherein said tubular shafts are disposed above the ground at a height which is one-half the radius of the smallest wheel of the vehicle.

3. A vehicle according to claim 1 wherein the extent to which the shafts of (e) can telescope in coaxial relationship is adjustable, whereby the distance between the front section and the rear section may be varied.

4. A vehicle according to claim 1 wherein said steering mechanism comprises a link system with a link rod, one end of which is swingably connected to a steering bar, which is in turn fulcrumed in the rear frame, the other end of said link rod being swingably connected to a knee lever, which is in turn fulcrumed in the front portion of the frame, said knee lever being rotatably connected to a tie-rod mechanism for the turning movement of the front wheels and the swivel axle of each front wheel is disposed substantially above and perpendicularly to the contact surface between the corresponding wheel and the ground.

* * * * *